United States Patent [19]

Gräff, deceased et al.

[11] Patent Number: 5,177,161
[45] Date of Patent: Jan. 5, 1993

[54] BINDERS, THEIR PREPARATION AND USE IN CURABLE MIXTURES

[75] Inventors: Hans Gräff, deceased, late of Schlangenbad; Robert Gräff, heir, Bensheimf; Adam Has, Mainz-Kastel; Wolfgang Hesse, Taunusstein, all of Fed. Rep. of Germany

[73] Assignee: Hoechst AG, Fed. Rep. of Germany

[21] Appl. No.: 497,561

[22] Filed: Mar. 21, 1990

[30] Foreign Application Priority Data

Mar. 23, 1989 [DE] Fed. Rep. of Germany ....... 3909593

[51] Int. Cl.$^5$ ..................... C08F 283/00; C08G 8/28
[52] U.S. Cl. .................................. 525/481; 523/424; 525/488
[58] Field of Search ................ 525/481, 488; 523/424

[56] References Cited

U.S. PATENT DOCUMENTS

| | | | |
|---|---|---|---|
| 4,010,163 | 3/1977 | Hesse et al. | 524/596 |
| 4,611,036 | 9/1986 | Sekiguchi et al. | 525/481 |
| 4,772,669 | 9/1988 | van Iperen et al. | 525/481 |

Primary Examiner—Morton Foelak
Assistant Examiner—T. Mosley
Attorney, Agent, or Firm—Bierman and Muserlian

[57] ABSTRACT

The invention relates to a binder (A) which contains hydroxyl groups and carboxyl groups, the latter optionally in neutralized form, wherein the binder (A) is essentially composed of a mixture of polyalkylidenepolyphenols (B) having average degrees of condensation of 2.3 to 8.0 and average molecular weights $\overline{M}_n$ of 250 to 1,000, these polyalkylidenepolyphenols (B) containing phenolic OH groups and carboxyl groups, and polyaddition products (C) containing structural units (d) which are derived from epoxide compounds (D) which on average contain at least two (1,2-)epoxide groups per molecule, the structural units (d) having an average molecular weight $\overline{M}_n$ of 600 to 10,000, and containing structural units (b) which are derived from the polyalkylidenephenols (B), and these polyaddition products (C) have average molecular weights $\overline{M}_n$ of at least 1,100.

Coating preparations which contain this binder (A) are suitable in particular for the internal coating of containers for the food industry, this coating having, in particular, very low release of harmful substances and good resistance to sterilization temperatures.

24 Claims, No Drawings

BINDERS, THEIR PREPARATION AND USE IN CURABLE MIXTURES

EP-A-87,454 discloses the preparation of cationic epoxy resin pre-condensates which may also be water-dilutable after protonization. However, these and also other cationic epoxy resin combinations have the disadvantage of inadequate resistance toward acid contents due to their cationic character when used for the internal finishes of food or drink containers. The water-dilutable cationic epoxy resin combinations are often in the form of dispersions and, when they are being applied, for example by roller coating or spray coating, there are further problems, for example owing to streaking on the substrate.

Anionic, carboxyl-containing binders based on epoxy resins for use in finishes for internally coating food or drink containers are described in U.S. Pat. No. 4,212,781 and U.S. Pat. No. 4,308,185. In these binders, the carboxyl groups are introduced by grafting of (meth)acrylic acid, optionally as a blend with other copolymerizable monomers, onto the epoxy resin. Here, the grafting reaction is accompanied by a homo(co)-polymerization which results in the eventual product being a mixture of graft polymers, unconverted epoxy resin and homo(co)polymer. These systems have in particular the disadvantage that the solids content of the waterborne coatings is relatively low and the proportion of organic (auxiliary) solvent is relatively high. Moreover, additional crosslinking agents are required, which release harmful substances on crosslinking.

Furthermore, Ullmann, 4th edition, volume 18, pages 251/252 discloses anionic, water-thinnable phenolic resins which are produced, for example, by condensation reactions of resoles with haloalkanoic acids. However, after crosslinking these produce coatings which are stiff and brittle and consequently suitable only for nondeformable substrates. These anionically modified resoles are modified by plasticization with polyadducts of polymer oils with maleic anhydride. Due to their low surface hardness, to the release of flavoring substances, to their inadequate resistance to sterilizing temperatures and also to their residual monomer content, water-dilutable finishes of this type are unsuitable as internal finishes for food or drink containers. Moreover, due to the low acid strength of maleic anhydride adducts, an excessively high proportion of carboxyl groups is required.

The object of the invention is therefore to provide a binder for coating preparations for use in particular in the food and drink sector, where the said binder does not have the above disadvantages or at least has them only to a limited extent and which, in particular, allows the production of coating preparations or coatings having good properties in use and also a low tendency to release harmful substances and high resistance to sterilization temperatures.

It has now been found that certain hydroxyl- and carboxyl-containing adducts made from polyepoxide compounds (epoxy resins) and polyalkylidenephenols (resoles, novolaks) surprisingly have these advantageous properties.

The invention accordingly provides a binder (A), in particular for curable mixtures such as coating preparations, this binder containing hydroxyl groups and carboxyl groups, the latter optionally in neutralized form, wherein the binder (A) is essentially composed of a mixture of polyalkylidenepolyphenols (B) having average degrees of condensation of 2.3 to 8.0 and average molecular weights $\overline{M}_n$ of 250 to 1,000, these polyalkylidenepolyphenols (B) containing phenolic OH groups and carboxyl groups, and polyaddition products (C) containing structural units (d) which are derived from epoxide compounds (D) which on average contain at least two (1,2-)epoxide groups per molecule, the structural units (d) having an average molecular weight $\overline{M}_n$ of 600 to 10,000, and containing structural units (b) which are derived from the polyalkylidenephenols (B), and these polyaddition products (C) have average molecular weights $\overline{M}_n$ of at least 1,100.

The invention also provides a process for the preparation of this binder, and provides curable mixtures (finish preparations) which contain this binder and also provides the use of these curable mixtures for the preparation of coatings.

The binder (A) according to the invention has an average molecular weight $\overline{M}_n$ (number average; determined using gel chromatography; phenolic resin standard) which is generally between 300 and 6,000, preferably between 400 and 4,000, while the weight-average molecular weight $\overline{M}_w$ is generally between 1,500 and 120,000, preferably between 2,400 and 72,000 and the dispersity (non-uniformity of molecular weight) is between 5.0 and 20, preferably between 6 and 18. The viscosities of the aqueous solutions of (A) are 20 to 10,000, preferably 50 to 5,000 mPa.s/20° C., at a proportion of (A) of 30 to 50% by weight.

Generally, the binder (A) according to the invention has hydroxyl numbers in the range of from 100 to 540, preferably from 200 to 400, and acid numbers in the range of from 10 to 250, preferably from 10 to 150. The number of carboxyl groups per molecule of binder is preferably such that the binder (A), at least after neutralization of these carboxyl groups, is dispersible or preferably even (colloidally) soluble in water or in mixtures of water and up to 20% by weight of organic (auxiliary) solvents.

In this case, the carboxyl groups in (A) are in the form of carboxyalkylene and/or carboxyalkylidene groups, preferably as carboxymethylene groups, and are virtually exclusively bonded to the polyalkylidenephenols (B) and to the structural units (b) in the polyaddition products (C).

The hydroxyl groups in the binder (A) are phenolic OH groups in (B) and optionally in the structural units (b), and also optionally methylol groups in (B) and (b), and aliphatic OH groups in the structural units (d).

The components (B) and (C) are present in the binder (A) according to the invention essentially as a physical mixture; as a rule, the gel content in (A) is less than 5% by weight, preferably less than 1% by weight.

The amount of (B) in the binder (A) is usually about 15 to 70% by weight, preferably about 25 to 55% by weight, based on (B) and (C).

The polyalkylidene phenols (B) have degrees of condensation of preferably 2.5 to 6.0 and average molecular weights $\overline{M}_n$ which are generally from 250 to 1,000, preferably from 300 to 800. Besides phenolic OH groups, these polyalkylidene phenols have carboxyalkylene and/or carboxyalkylidene groups which are derived from the phenolic OH groups by reaction with the halocarboxylic acid in the second step of the process according to the invention. The number of oxygen atoms bonded to the aromatic nucleus (i.e. the sum of the phenolic OH groups and carboxyalkylene/carboxyalkylidene groups is generally at least 2.3, preferably 2.5 to 6. The ratio of these oxygen atoms bonded to the aromatic nucleus to the carboxyl groups in (B) is 1:0.05 to 1:0.9, preferably 1:0.1 to 1:0.8 and that of the oxygen atoms bonded to the aromatic nucleus to the methylol groups is 1:0.1 to 1:1.5, preferably 1:0.15 to 1:1.

The proportion of unconverted phenols in (B) generally does not exceed 0.2% by weight and is preferably less than 0.1% by weight.

The polyaddition products (C) are composed essentially of structural units (b) and (d) and also optionally of other structural units at the molecular chain-ends, these structural units being derived from any chain terminator which has been used.

Depending on the number of phenolic OH groups in the polyalkylidenepolyphenol (B) and the proportion of (B) to epoxide compound (D) in the preparation of (C), the molecular chain of (C) may contain two or more structural units (b), i.e. (if (b)>2), the chain of (D) is extended.

The ratio of numbers of (d) to numbers of (b) in the polyaddition product (C) is generally 1:>1, preferably 1:1.1 to 1:2. As a rule, the molecular weight distribution $\overline{M}_n$ of (C) is between 1,100 and 100,000.

The preparation of the binder (A) according to the invention is carried out by reacting polyalkylidenepolyphenols (B') and the epoxide compounds (D) in the melt or in the presence of a diluent, and optionally in the presence of a catalyst, at elevated temperatures, the ratio of equivalents of the epoxide groups of (D) and the phenolic hydroxyl groups of (B') being between 1:4 and 1:100, and then in a second step bringing the resulting product into reaction with a halocarboxylic acid and optionally with formaldehyde in the presence of a basic catalyst and optionally in the presence of a solvent or diluent and then isolating the binder (A) obtained in this manner, optionally after appropriate purification.

The polyalkylidenephenols (B') have a corresponding structure to that of the polyalkylidenephenols (B) but with the difference that they have no carboxyl groups and, to the extent that they are present in (B), no methylol groups either.

The preparation of these polyalkylidenephenols (B') is carried out in a known manner by (co)condensation of monohydric or polyhydric, optionally alkyl-substituted phenols with aldehydes which generally have carbon numbers from 1 to 12, preferably 1 to 9, and in particular 1 or 2, in the presence of catalysts, the particular phenol being used in excess. The phenols are preferably trifunctional toward the aldehydes. Examples of the said phenols are: phenol, m-cresol, 3,5-dimethylphenol; and also bifunctional phenols such as 1,3,4-xylenol and o(p)-alkylphenols such as o(p)-cresol etc. Preference here is given to the use of phenol. Preference is given to the use of formaldehyde as the aldehyde. Other suitable aldehydes are acetaldehyde, propionaldehyde, butyraldehyde, isobutyraldehyde, valeraldehyde, hexyl-, heptyl-, octyl-, nonyl- and decylaldehyde and isomers thereof. Suitable catalysts are in particular acidic catalysts such as protonic acids, for example sulfuric acid, phosphoric acid, hydrochloric acid, or Lewis acids, for example boron trifluoride or aluminum phenolate.

After the condensation reaction, the excess phenol is substantially removed, for example by vacuum distillation. The degree of condensation can be calculated from the yield or from the number average of the molecular weight distribution. Further references to the preparation of these polyalkylidenephenols (B') may be found, inter alia, in Wagner/Sarx "Lackkunstharze" (5th edition; 1971), published by Hanser Verlag, pages 24-59 and also in Ullmann, 4th edition, volume 18, pages 250/252.

The epoxide compounds corresponding to (D) preferably have, on average, two epoxide groups per molecule and an average epoxide equivalent weight of 300 to 5,000, preferably 400 to 4,000. The average molecular weight Mn is generally between 600 and 10,000, preferably between 800 and 8,000. The epoxide compounds are preferably polyglycidyl ethers (epoxy resins), prepared by reacting polyhydric, preferably dihydric, alcohols, phenols (diphenylolalkanes) and/or hydrogenation products of these phenols with corresponding bifunctional epoxides in particular epichlorohydrin. Examples of polyhydric phenols are: resorcinol, hydroquinone, 2,2-bis-(4-hydroxyphenyl)propane (bisphenol A), isomer mixtures of dihydroxyphenylmethane (bisphenol F), tetrabromobisphenol A, 4,4'-dihydroxydiphenylcyclohexane, 4,4'-dihydroxy3,3'-dimethyldiphenylpropane, 4,4'-dihydroxydiphenyl, 4,4'-dihydroxybenzophenol, 1,1,-bis(4-hydroxyphenyl)ethane, 1,1-bis(4-hydroxyphenyl)isobutane, 2,2-bis(4-hydroxy-tert-butylphenyl)propane, bis(2-hydroxy-naphthyl)methane, 1,5-dihydroxynaphthalene, tris(4-hydroxyphenyl)methane, bis(4-hydroxyphenyl) ether, bis(4-hydroxyphenyl) sulfone and so on. Particular preference is given here to bisphenol A. References to other suitable epoxide compounds (a) may also be found in EP-A-272,595 and also in DE-A-3,711,947. The epoxide compounds (a) may be used as such. However, it is often advantageous to react a portion of the reactive epoxide groups with a modifying material in order to improve the film properties. Particular preference is given here to reacting the epoxide groups with a polyol.

The reaction of (B') and (D) is carried out in the melt, or in the presence of a solvent or diluent which does not impair the condensation, at elevated temperatures, generally at 110° to 180° C., preferably 120° to 160° C., advantageously in the presence of a catalyst. Examples of catalysts are phosphines such as trialkyl($C_1$-$C_6$)phosphine or triphenylphosphine, phosphonium salts such as for example benzyltrimethylphosphonium chloride, tertiary amines such as for example benzyldimethylamine, quaternary ammonium salts such as for example tetramethylammonium chloride, alkali metal hydroxides such as NaOH, LiOH, alkali metal carbonates such as sodium carbonate, lithium carbonate, alkali metal salts of organic acids such as sodium formate and lithium benzoate.

Examples of suitable solvents are: ethylene glycol mono- or di-ethers, propylene glycol mono- or di-ethers, butylene glycol mono- or di-ethers of monoalcohols having an optionally branched alkyl radical of 1 to 6 carbon atoms, tetrahydrofuran, aliphatic alcohols having optionally branched alkyl radicals of 1 to 12 carbon atoms such as methanol, ethanol, propanol, butanol, araliphatic and cycloaliphatic alcohols such as benzyl alcohols or cyclohexanol, cycloaliphatic or aromatic hydrocarbons such as hexane, heptane, cyclohexane, toluene, xylenes, Solvesso® or ketones such as acetone, methyl isobutyl ketone and cyclohexanone. The boiling point of these solvents is preferably not above 210° C. It is also possible to use mixtures of various solvents.

The progress of the condensation reaction between (B') and (D) can be monitored using the viscosity, the melting point and the concentration of epoxide groups, which approaches zero. In this reaction, the component (B') is used in excess so that in the resulting polyaddition product the mostly relatively high molecular weight long chain structural units (d) form the bridging elements which link the mostly low molecular weight shorter-chain structural units (b) to one another. To this end, the compounds (B') and (D) are generally used in amounts such that the ratio of equivalents of the epoxide groups of (D) and the phenolic OH groups of (B') reacting with them is between 1:4 and 1:100, preferably between 1:6 and 1:80, and a (the larger) portion of (B') is not converted.

In certain circumstances, it may be advantageous to add chain terminators during the reaction of (B') and (D), i.e. compounds which react monofunctionally and terminate the chain at a desired length. Suitable compounds for this purpose are in particular monoepoxide compounds such as propylene oxide, hexene oxide or glycidyl ethers, for example phenyl glycidyl ether, cresyl glycidyl ether, ethylhexyl glycidyl ether and butyl glycidyl ether. It is also possible to react (D) with these compounds beforehand.

In the process according to the invention, carboxyl groups and optionally methylol groups are introduced in a second process step following the polyaddition reaction described above so as to obtain the anionic and substantially self-crosslinking binder (A). For this purpose, the reaction product from the first process step is reacted in aqueous solution with one or more halocarboxylic acids and optionally, before, during or after this reaction, with formaldehyde.

The halocarboxylic acid - this term is intended to include both mono- and poly-(di, tri)halocarboxylic acids - is preferably an aliphatic carboxylic acid and generally has 1 to 6, preferably 1 to 3 carbon atoms in the chain. It is preferably an a-bromo- or a-chlorocarboxylic acid, preference being given to monohalocarboxylic acids and in particular to monochloroacetic acid. These acids can also be in the form of their salts, in particular alkali metal salts, and may also be used as mixtures.

Owing to the heat sensitivity of these reaction products, the reactions are advantageously carried out at average temperatures of between 30° and 90° C., preferably between 50° and 70° C. in organic solvents such as for example in those mentioned above, in particular in butanol, aromatics or mixtures thereof.

The reaction with the aldehyde, in particular formaldehyde, is advantageously carried out using a basic catalyst and the reaction with the halocarboxylic acids is advantageously carried out using a basic condensing agent. Here, it is advantageous to select those catalysts which satisfy both conditions. This is the case, for example, with sodium hydroxide or potassium hydroxide which are preferably used for this purpose.

The salts which are produced in the second reaction step are washed out with water after the reaction of formation. Any excess of condensing agent must be neutralized or over-neutralized beforehand. The solutions or dispersions of the binder (A) obtained in this way can be used as binders in coating or impregnating compositions, optionally after dilution with other organic solvents and removal of the water and optionally after the addition of customary additives. The binder (A) is isolated in solid form by distilling off the solvent(s).

The binder (A) can be obtained as an aqueous dispersion by converting it into salt form. This is preferably carried out using nitrogen bases such as ammonia or amines, in particular tertiary amines for example trialkylamines having 1 to 12, preferably 1 to 6 carbon atoms in each alkyl radical. Examples of these are trimethylamine, triethylamine, methyldiethylamine and tripropylamine. The alkyl radicals may for example also have hydroxyl groups as in dialkylmonoalkanolamines, alkyldialkanolamines and trialkanolamines.

Examples of these are dimethylethanolamine, and dimethylpropanolamine. After neutralization with the base, which is advantageously used in aqueous form, the binder is water-dilutable. Any solvents used in the preparative process are not needed or only partially needed for the preparation of the aqueous solution. They can be partially or substantially removed before or after addition of the bases, for example by distillation, steam distillation or extraction.

In the curable mixtures, in particular coating preparations, of the invention, the proportion of binder (A) is generally 2 to 50% by weight, preferably 5 to 40% by weight, based on the total mixture. The total solids content (135° C./1 h) of these mixtures is usually 2 to 75% by weight, preferably 5 to 60% by weight.

Suitable diluents (E) are water and also the organic solvents mentioned above and also corresponding mixtures. To some extent, these diluents act simultaneously as agents for improving film formation or reducing the coalescence temperature. The said diluents include, in particular, high boilers such as glycol ethers and in particular those such as hexyl glycol, n-butylpropyl glycol, isobutyl dipropylene glycol etc. which are only partially water-dilutable.

Examples of customary additives in the sense of (F) which may be present in the mixture according to the invention are the customary coating additives, such as pigments, pigment pastes, antioxidants, flow control agents or thickeners, antifoams and/or wetting agents, reactive diluents, fillers, curing catalysts, curing agents and other curable resins, and the like. These additives (F) can optionally be added to the curable mixture only directly before processing.

In the case of the preferred use of the curable mixtures according to the invention in the food industry, a majority of the abovementioned additives (F) can normally be dispensed with.

Suitable additional curing agents for the binders (A) which are predominantly self-crosslinking (and crosslink by the action of heat), are amine resins such as urea-, melamine-, dicyanodiamide- and guanamine resins and so on. However, other self-curing substances may also be used, for example phenolresoles or alkylphenolresoles. Hexamethylenetetramine or other formaldehyde donors are also suitable. The crosslinking reaction can be accelerated by using crosslinking catalysts. For this purpose, particular use is made of acids such as for example phosphoric acid and oxalic acid. In aqueous systems, it is advantageous to neutralize these acids with the same cation as was crosslinked with the overall resin.

Examples of other curable resins are the resins which are soluble or dispersible in the coating medium and based on hydroxyalkylacryloyl esters, hydroxyalkyds, polyesters, epoxy resins and the like.

Other additives (F) which may be mentioned are compounds which enhance the anion-forming action of the neutralizing agents (nitrogen bases) and which promote physical drying. This is important particularly when using the mixtures according to the invention at room temperature or below. Examples of the above-mentioned compounds which may be mentioned are oxo-compounds or substances which release oxo-compounds such as for example urea resins, melamine resins, dicyanodiamide resins etc.

As mentioned, the curable mixtures of the invention are particularly suitable for the internal coating of food and drink containers, where they have particularly good resistance to attack by acidic contents owing to their anionic character. On crosslinking, physiologically harmful substances such as phenol and formaldehyde are not released or, if at all, only in trace quantities. When the said curable mixtures are in the form of aqueous systems (waterborne coatings) which contain no organic auxiliary solvents or a maximum of up to 20% by weight, preferably up to 15% by weight, of organic auxiliary solvents, there is no or only a slight release of organic substances.

Besides this, the mixtures according to the invention can also be used for preparing coatings for other fields of application such as pressure pads, for improving the adhesion of fibers, for example, to rubber and also as impregnating agents for porous or fibrous substrates. They are also suitable for those applications in which heat treatment of the coating is not applied or cannot be applied.

The said mixtures are deposited on the substrate such as metal, wood, glass, concrete, plastic, ceramic etc. by conventional methods such as brush coating, spray coating, dip coating, roller coating or by electrophoresis (electro-dip-coating). If no curing agent for cold-curing has been used, the coatings are cured by heating to 100° to 250° C. for an adequate time for curing, generally about five minutes up to about one hour.

In the following examples, % are by weight and parts are parts by weight. The viscosity was measured in every case at room temperature using the Brookfield viscometer.

EXAMPLE 1

I. Preparation of the binder (A)

a) 70 parts of phenol, 0.4 parts of maleic anhydride and also 32.2 parts of 30% strength aqueous formaldehyde solution are boiled for 3 hours under reflux in a reaction vessel equipped with a thermometer, a stirrer, a reflux condenser, a descending condenser and a device for reducing the pressure. Then the volatile components were distilled off under reduced pressure until a bottoms temperature of 220° C. was reached. There remained in the reaction vessel 49.9 parts of a polymethylenepolyphenol having a viscosity of 290 mPa.s/29° C., measured on a 50% strength solution in ethylene glycol monoethyl ether. The number average of the molecular weight distribution $\overline{M}_n$ determined by gel chromatography, was 461.

b) 40 parts of the polymethylenepolyphenol according to a) were melted, 0.02 parts of dimethylaminopropylamine were added with stirring and 60 parts of an epoxy resin based on diphenylolpropane and epichlorohydrin having an epoxide equivalent weight of 1,950 (®Beckopox EP 307 from Hoechst AG) were incorporated in the melt. The melt was brought to a temperature of 140° C. under an atmosphere of nitrogen and this temperature was maintained for 8 hours. The softening point (capillary method) of the reaction product increased to 98° C. At the end of the reaction time, the batch was dissolved using 60 parts of n-butanol and 40 parts of xylene. The solution had a viscosity of 8,250 mPa.s/20° C.

c) 124 parts of the resin solution obtained according to b) were brought to a temperature of 60° C., 7.22 parts of 33% strength sodium hydroxide solution and 6.44 parts of 37% strength aqueous formaldehyde solution were added and the batch was stirred at 60° C. until, after 3 hours, the proportion of free formaldehyde was 0.1%. Then a further 20.2 parts of sodium hydroxide solution and 9.77 parts of monochloroacetic acid were added and the batch was stirred at 60° C. until, after 4 to 5 hours, the proportion of sodium hydroxide became constant at between 0.35 and 0.4%.

Then the batch was brought to a pH of 2.0 to 2.2 using 24.59 parts of 25% strength aqueous sulfuric acid. After separating off the lower layer of liquor and the crystals which were being deposited, the batch was heated to 75° to 80° C. and washed with 20 parts of distilled water. After separating off the washings, the batch was dehydrated at 80° C. by vacuum cycle distillation and the resin solution was freed from deposited solid materials by filtration.

The resin solution obtained was a binder in a coating composition for applying in the conventional manner.

To convert the said resin solution into a water-dilutable resin solution, the volatile solvents contained in it were removed at a pressure of 20 mbar and a bottoms temperature of 80° C. in the course of 3 hours. Addition of 60 parts of deionized water and 8.33 parts of dimethylpropanolamine (80% strength) gave 180 parts of an aqueous 40.5% strength resin solution (1 hour/135° C.) having a viscosity of 240 mPa.s/20° C. at a pH of 7.4.

The resin solution contained 6.2% of n-butanol and 0.1% of xylene. Free formaldehyde and phenol were below the level of detection which was 0.02% for phenol and 0.01% for formaldehyde.

The molecular weight distribution of the binder (A) was determined in the absence of the solvent in relation to a phenolic resin calibration standard. The number average molecular weight was 1,374, the weight average 12,765 and the dispersity 9.290.

II. Testing of the coatings

After adding 3.6% of isobutyl dipropylene glycol ether with stirring, the resin solution according to I.c) was diluted with more water to a viscosity of 13.5 DIN seconds (orifice 4) and then tinned sheet steel was coated with the resin solution by dip coating and the coating crosslinked for 12 minutes at 200° C. In the cup test, the coatings were very readily deformable and in the test for resistance to sterilization temperatures at 120° C. for 1 hour, the coatings were resistant to 2% strength lactic acid. The baked coating film was resistant to acetone and methyl ethyl ketone.

Similar results are obtained using a resin solution according to I.c) if isobutyraldehyde, valeraldehyde or hexylaldehyde are used instead of formaldehyde in step I.a) in the preparation of (A).

EXAMPLE 2

I. Preparation of the binder (A)

1,186 parts of the solution, obtained according to Example 1, Ib, of a polyadduct composed of polymethylenepolyphenol and epoxy resin (Beckopox EP 307) in n-butanol and xylene having a viscosity of 8,250 mPa.s/20° C. were stirred at 60° C. for three hours with 143 parts of 33% strength sodium hydroxide solution and 115 parts of sodium chloroacetate until the concentration of sodium hydroxide was 0.5%. Then 100 parts of water and 230 parts of n-butanol were added, the pH was adjusted to 1.5 using 235 parts of 25% strength sulfuric acid and after the formation of a lower layer of liquor, this was separated off. The residue was washed four times with 200 parts of water, the washings were separated off and then 100 parts of xylene were added. The reactions and working-up processes were all carried out at 60° C. After separating off the final washings, 117 parts of water were eliminated by vacuum cycle distillation at a pressure of 215 mbar. There remained in the flask 1,472 parts of a 43.9% strength resin solution having a viscosity of 1,000 mPa.s/20° C. and an acid number of 31.3.

II. Testing of the coating 85 parts of resin according to I were diluted with 110 parts of methoxypropanol and films of 7 μm in thickness were applied to tinplate by dip coating. The coating films were baked at 200° C. for 12 minutes. The baked coating film was resistant to acetone and methyl ethyl ketone (100 double wipe cycles).

EXAMPLE 2a

Example 2 was repeated using 100 parts of sodium chloroacetate. After baking, the coating films had the same performance as those from Example 2.

EXAMPLE 2b

Examples 2 was repeated using 130 parts of sodium chloroacetate. The addition of sodium hydroxide solution was increased from 143 parts to 170 parts. The baked coating films had the same performance as those from Example 2.

EXAMPLE 3

I. Preparation of the binder (A)

a) 792 parts of 2,6-dimethylol-4-isooctylphenol were dissolved in 400 parts of xylene and 1,261 parts of phenol were added.

The mixture was dehydrated using cycle distillation at a temperature of up to 170° C. 143 parts of water were eliminated in this operation. The resin solution was freed initially of the solvent by distillation for one hour at 190° C. and then from the excess of phenol by distillation under a vacuum of 82 mbar. There remained 1,160 parts of an octylphenol-phenol mixed novolak having a melting point of 73° C. and a viscosity of 119 mPa.s/20° C. when dissolved 1:1 in ethylene glycol.

b) 750 parts of this resin obtained as described above were melted together with 750 parts of the epoxy resin from Example 1, Ib, then 0.45 parts of dimethylaminopropylamine were added and the batch was heated to 160° C. under an atmosphere of nitrogen. This temperature was maintained for seven hours and then the batch was dissolved in 900 parts of n-butanol and 600 parts of xylene. Before the addition of solvent, the resin had a melting point of 90° C. The solution had a concentration of 51.2% (1 h/135° C.) and a viscosity of 2,350 mPa.s with a yield of 2,970 parts.

c) To 2,371 parts of this solution were added at 60° C. 138 parts of sodium hydroxide solution and 135 parts of 37% strength aqueous formaldehyde and the batch was stirred at this temperature for six hours until the concentration of free formaldehyde reached 0.5%. Then a further 170 parts of 33% strength sodium hydroxide solution and 253 parts of sodium chloroacetate were added and stirring was continued for a further six hours. At the end of this period, the concentration of free formaldehyde was 0.2% and the concentration of sodium hydroxide was 0.4%. To the batch were added at 60° C. 200 parts of water and 460 parts of n-butanol and the batch was brought to a pH of 1.3 using 585 parts of 25% strength sulfuric acid. After separation off of the lower layer of liquor, the batch was washed four times with 395 parts of water on each occasion and the washings were separated off. The reactions, neutralizations and separations were all carried out at 60° C. After separating off the final washings, there remained in the reaction vessel 2,921 parts of a 44.1% strength (1 h/1350° C.) resin solution having an acid number of 30.4.

To 1,455 parts of the resin solution obtained were added 948 parts of water and a distillation was carried out under a vacuum of 200 mbar at a bottoms temperature of 80° C. and a bath temperature of 100° C. to remove the components which were volatile under these conditions. This gave 656 parts of an organic phase and 347 parts of an aqueous phase. At the end of the distillation, 63.3 parts of dimethylethanolamine were added to the resin suspension and after adding a further 300 parts of water the residual solution had a concentration of 39.2% (1 h/135° C.). The pH of this aqueous solution was 8.0. 1,755 parts of the aqueous resin solution were obtained having a viscosity of 2,730 mPa.s/23° C. The yield was 1,755 parts.

II. Testing of the coating

The resin solution was diluted with water to give a viscosity of 15 DIN-seconds (orifice 4) and tinplate was coated with this solution as in Example 1.II. The films were resilient and well crosslinked and in this respect similar to those from Example 1.

EXAMPLE 3a

The procedure of Example 3 was repeated but, in the first step, instead of 798 parts of 3,6-dimethylol-4-isooctylphenol, 630 parts of 2,6-dimethylol-4-para-tert-butylphenol were used. The similarly-conducted reactions and tests gave the identical result to that in Example 3.

EXAMPLE 3b

The procedure of Example 3a was repeated but dimethylolpara-tert-butylphenol was replaced by the equivalent amount of dimethylolparacresol.

EXAMPLE 3c

The procedure of Example 3a was repeated but dimethylolpara-tert-butylphenol was replaced by the equivalent amount of 2,6-dimethylol-isononylphenol.

We claim:

1. A binder (A) which contains hydroxyl groups and carboxyl groups, the latter optionally in neutralized form, wherein the binder (A) is essentially composed of a mixture of polyalkylidenepolyphenols (B) having average degrees of condensation of 2.3 to 8.0 and average molecular weights $\overline{M}_n$ of 250 to 1,000, these polyalkylidenepolyphenols (B) containing phenolic OH groups and carboxyl groups, and polyaddition products (C) containing structural units (d) which are derived from epoxide compounds (D) which on average contain at least two (1,2)epoxide groups per molecule, the structural units (d) having an average molecular weight $\overline{M}_n$ of 600 to 10,000, and containing structural units (b) which are derived from the polyalkylidenephenols (B), and these polyaddition products (C) have average molecular weights $\overline{M}_n$ of at least 1,100.

2. The binder (A) as claimed in claim 1, wherein its hydroxyl number is 100 to 540 mg of KOH/g and its acid number is 10 to 250 mg of KOH/g.

3. The binder (A) as claimed in claim 1, wherein its average molecular weight $\overline{M}_n$ is 400 to 4,000 and its dispersity is 5.0 to 20.

4. The binder (A) as claimed in claim 1, wherein the amount of polyalkylidene polyphenols (B) is 15 to 70% by weight, based on (B) and (C).

5. The binder (A) as claimed in claim 1, wherein the carboxyl groups are present in the form of carboxyalkylene or carboxyalkylidene groups, preferably carboxymethylene groups, and are bonded to (B) and also to the structural units (b).

6. The binder (A) as claimed in claim 1, wherein the polyalkylidenephenols (B) and the structural units (b) contain methylol groups.

7. The binder (A) as claimed in claim 1, wherein the ratio in (B) and in (b) between oxygen atoms bonded to the aromatic nucleus and carboxyl groups is 1:0.05 to 1:0.9.

8. The binder (A) as claimed in claim 1, wherein the ratio in (B) and in (b) between oxygen atoms bonded to the aromatic nucleus and methylol groups is 1:0.1 to 1:1.5.

9. The binder (A) as claimed in claim 1, wherein the average degree of condensation of (B) is 2.5 to 6.0.

10. The binder (A) as claimed in claim 1, wherein the polyaddition products (C) have average molecular weights $\overline{M}_n$ of 1,100 to 100,000.

11. The binder (A) as claimed in claim 1, wherein the average molecular weight $\overline{M}_n$ of the structural units (d) is 800 to 8,000.

12. The binder (A) as claimed in claim 1, wherein the epoxide compound (D) is a polyglycidyl ether based on a polyhydric, preferably dihydric phenol.

13. The binder (A) as claimed in claim 1, wherein the ratio of the number of structural units (d) to (b) in the polyaddition products (C) is 1:>1 to 1:2.

14. A process for the preparation of the binder (A) as claimed in claim 1, which comprises reacting polyalkylidenepolyphenols (B') and the epoxide compounds (D) in the melt or in the presence of a diluent, and optionally in the presence of a catalyst, at elevated temperatures, the ratio of equivalents of the epoxide groups of (D) and the phenolic hydroxyl groups of (B') being between 1:4 and 1:100, and then in a second step bringing the resulting product into reaction with a halocarboxylic acid and optionally with formaldehyde in the presence of a basic catalyst and optionally in the presence of a solvent and then isolating the binder (A) obtained in this manner, optionally after appropriate purification.

15. The process as claimed in claim 14, wherein the reaction of (D) with (B') is carried out at temperatures of 110° to 180° C. and the reaction in the second step is carried out at temperatures of 30° to 90° C.

16. The process as claimed in claim 14, wherein the ratio of equivalents of epoxide groups to phenolic hydroxyl groups is between 1:6 and 1:80.

17. The process as claimed in claim 14, wherein the proportion of (D) to (B') is between 30:70 and 80:20, preferably between 40:60 and 70:30.

18. The process as claimed in claim 14, wherein the haloalkanoic acid used is monochloroacetic acid.

19. The process as claimed in claim 14, wherein the preparation of an aqueous, substantially solventfree dispersion of binder (A) is achieved by substantially freeing from solvents the solvent-containing system obtained from the condensation reaction and the subsequent carboxylation reaction by means of distillation and/or steam distillation, optionally under reduced pressure, and then optionally adding an auxiliary solvent from the category of high-boiling, water-dilutable organic solvents, neutralizing the carboxyl groups, and then diluting the reaction mixture with water.

20. The process as claimed in claim 19, wherein the neutralization is carried out using ammonia or amines.

21. A curable mixture containing the binder (A) as claimed in claim 1 or obtained as claimed in claim 14, a diluent (E) and optionally customary additives (F).

22. The curable mixture as claimed in claim 21, wherein the diluent (E) is entirely or predominantly water and the binder (A) is present in neutralized form.

23. The curable mixture as claimed in claim 21, wherein (E) is a mixture of water and auxiliary solvent and the amount of the latter is up to 20% by weight, based on the water.

24. The method of using the curable mixture as claimed in claim 21 for producing coatings.

* * * * *